(12) United States Patent
Allen

(10) Patent No.: US 8,620,502 B2
(45) Date of Patent: Dec. 31, 2013

(54) COOLANT CIRCULATION HEATER FOR AN ELECTRIC VEHICLE BATTERY

(75) Inventor: Robert J. Allen, Chaska, MN (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 0 days.

(21) Appl. No.: 13/109,441

(22) Filed: May 17, 2011

(65) Prior Publication Data
US 2012/0295141 A1   Nov. 22, 2012

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G05D 23/00 | (2006.01) |
| G06F 7/00 | (2006.01) |
| G06F 17/00 | (2006.01) |
| F25D 17/00 | (2006.01) |
| F25D 17/04 | (2006.01) |
| F25B 39/04 | (2006.01) |
| F25B 29/00 | (2006.01) |
| F28F 27/00 | (2006.01) |
| B60H 1/00 | (2006.01) |
| B60K 1/00 | (2006.01) |
| B60K 6/20 | (2007.10) |
| B60K 17/30 | (2006.01) |

(52) U.S. Cl.
USPC .............. 701/22; 700/300; 62/177; 62/183; 62/186; 165/200; 165/266; 165/271; 165/287; 165/299; 165/300; 180/65.1; 180/65.21; 180/265

(58) Field of Classification Search
USPC ............. 700/300; 701/22; 62/177, 183, 186; 180/65.1, 65.21, 265; 165/200, 266, 165/271, 287, 299, 300
See application file for complete search history.

(56) References Cited

U.S. PATENT DOCUMENTS

| | | | | |
|---|---|---|---|---|
| 3,362,224 A | * | 1/1968 | Melone | 73/327 |
| 3,781,839 A | * | 12/1973 | Bodge | 340/595 |
| 5,538,439 A | | 7/1996 | Fell et al. | |
| 6,411,063 B1 | * | 6/2002 | Kouzu et al. | 320/150 |
| 6,624,615 B1 | | 9/2003 | Park | |
| 2003/0080714 A1 | * | 5/2003 | Inoue et al. | 320/150 |

(Continued)

FOREIGN PATENT DOCUMENTS

| | | | | | |
|---|---|---|---|---|---|
| JP | H08-186905 | * | 7/1996 | | B60L 3/00 |
| WO | WO2009/140199 A2 | * | 11/2009 | | H02J 7/32 |

OTHER PUBLICATIONS

Real Dictionary (Pump, Real Dictionary Princeton Univ. Princeton NJ USA 2001 Available May 26, 2003).*

(Continued)

*Primary Examiner* — Patrick Ryan
*Assistant Examiner* — Aaron Greso
(74) *Attorney, Agent, or Firm* — Harness, Dickey & Pierce, P.L.C.

(57) ABSTRACT

An electric vehicle battery heater includes a housing having a coolant inlet and a coolant outlet. A heating element is positioned within the housing in a heat transfer relationship with coolant for transferring heat to an electric vehicle battery. A thermistor is positioned in the housing to output a signal indicative of a temperature of the battery coolant. A controller energizes the heating element when the signal represents that the coolant temperature is less than a predetermined lower limit.

5 Claims, 6 Drawing Sheets

(56) References Cited

U.S. PATENT DOCUMENTS

| | | |
|---|---|---|
| 2005/0264257 A1* | 12/2005 | Inui .............................. 320/104 |
| 2007/0024244 A1* | 2/2007 | Zhu et al. ...................... 320/150 |
| 2008/0012535 A1* | 1/2008 | Takatsuji et al. ............. 320/150 |
| 2010/0054303 A1* | 3/2010 | Wakabayashi ................ 374/208 |
| 2010/0104927 A1* | 4/2010 | Albright ......................... 429/50 |

OTHER PUBLICATIONS

Massoud (Engineering Thermofluids Springer-Verlag Berlin Germany 2005 p. 75.*

* cited by examiner

COOLANT CIRCULATION HEATER FOR AN ELECTRIC VEHICLE BATTERY

FIELD

The present disclosure generally relates to a system for maintaining an electric vehicle battery within a desired temperature operating range. A coolant heater and a coolant chiller are provided to transfer heat between the electric vehicle battery and the coolant.

BACKGROUND

Vehicles equipped with an electric motor to transfer drive torque to the driven wheels are becoming increasingly desirable by a greater number of users than ever before. One of the most prominent benefits of electric vehicle use includes eliminating undesirable emissions exhausted by an internal combustion engine. Furthermore, battery technology has sufficiently developed such that a reasonably sized battery pack may output enough energy to drive the electric motor and meet driver's needs for acceleration and range. To provide a usable vehicle in the field, the battery pack must also be efficiently charged and discharged many times.

One challenge facing electric vehicle designers includes the sensitivity of the electric vehicle batteries to temperature. More specifically, the maximum charge current and the maximum discharge current of the batteries vary based on battery temperature, among other things. The temperature of the battery may vary during operation due to chemical reactions taking place within the battery as well as the ambient temperature of the environment in which the vehicle is positioned. For example, the maximum charging current of a battery may be significantly reduced when the temperature of the battery is below a predetermined limit. Battery charging and discharging efficiency may also be less than optimal when the temperature of the battery is above a predetermined operating limit.

Furthermore, existing heaters for vehicle engines may not be suited to warm an electric vehicle battery pack. Many existing engine block heaters are energized by a 12v or 24v power supply. The watt-density of the heating element is defined accordingly. While these heaters perform a desired function, they may not be simply installed within an electric vehicle equipped with a high voltage power supply in the range of 450 Vdc. Controlling the heaters associated with the high voltage circuit also becomes very important to assure that an overheating condition is avoided. Therefore, it may be beneficial to provide a temperature control system to maintain a desired electric vehicle battery temperature.

SUMMARY

This section provides a general summary of the disclosure, and is not a comprehensive disclosure of its full scope or all of its features.

An electric vehicle battery heater includes a housing having a coolant inlet and a coolant outlet. A heating element is positioned within the housing in a heat transfer relationship with coolant for transferring heat to an electric vehicle battery. A thermistor is positioned in the housing to output a signal indicative of a temperature of the battery coolant. A controller energizes the heating element when the signal represents that the coolant temperature is less than a predetermined lower limit.

An electric vehicle battery temperature control system varies the temperature of a coolant flowing in a heat transfer relationship with an electric vehicle battery. The temperature control system includes a heater housing having a coolant inlet and a coolant outlet. A heating element is positioned within the housing in a heat transfer relationship with the coolant. A thermistor is positioned in the housing to output a signal indicative of a temperature of the battery coolant. A controller energizes the heating element when the signal represents that the coolant temperature is less than a predetermined lower limit. The controller determines a rate of coolant temperature increase and discontinues the supply of power to the heating element based on the temperature rate of change exceeding a predetermined threshold.

A method of controlling the temperature of a battery of an electric vehicle includes pumping coolant in a heat transfer relationship with the electric vehicle battery. The coolant flows through a heater. A thermistor is positioned within the heater to output a signal indicative of the coolant temperature. A temperature of the coolant is determined. The heater is energized to increase the temperature of the coolant based on the determined coolant temperature being less than a predetermined lower limit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
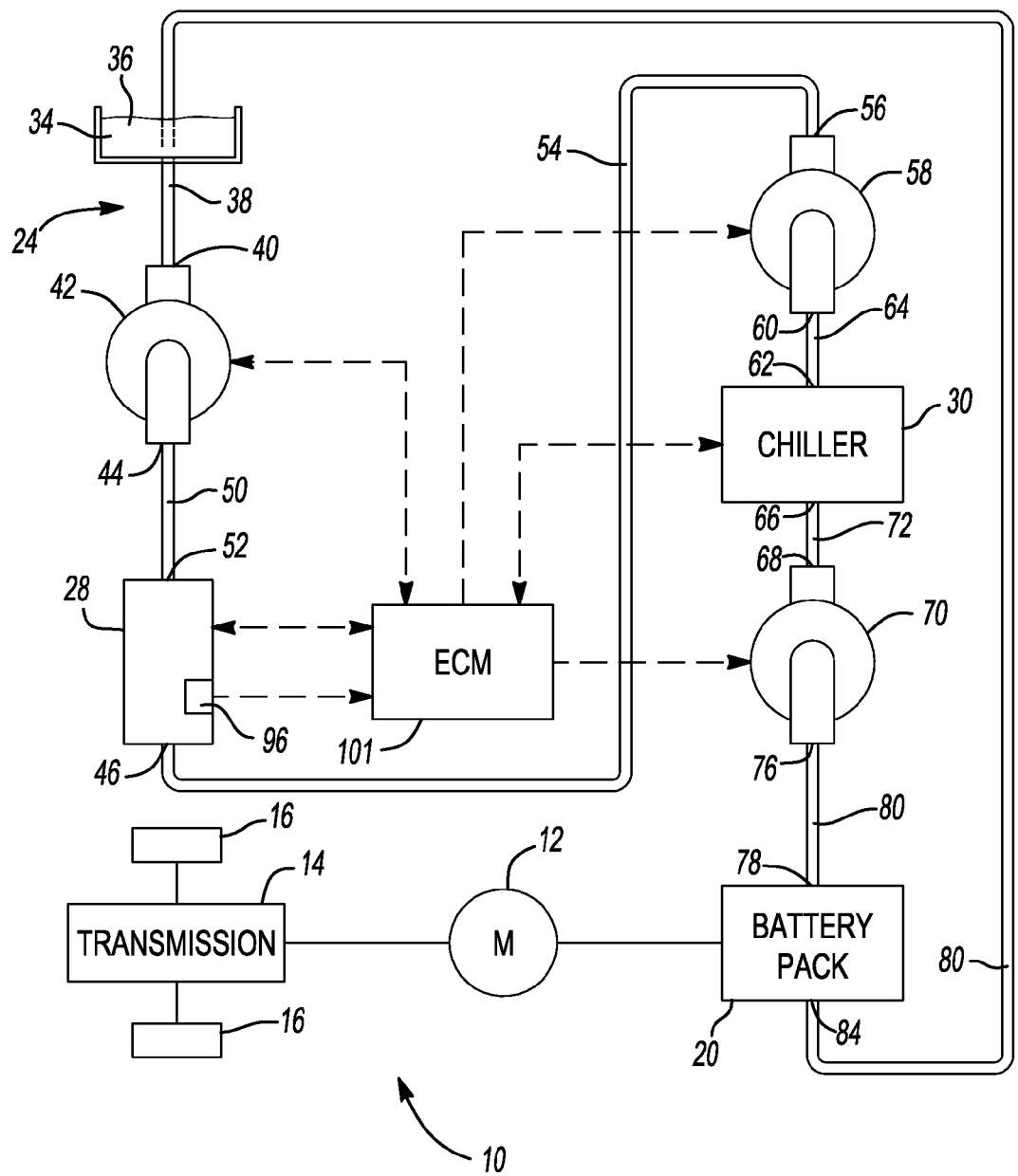
FIG. 1 is a schematic depicting an electric vehicle battery thermal management system.
Figure 2:
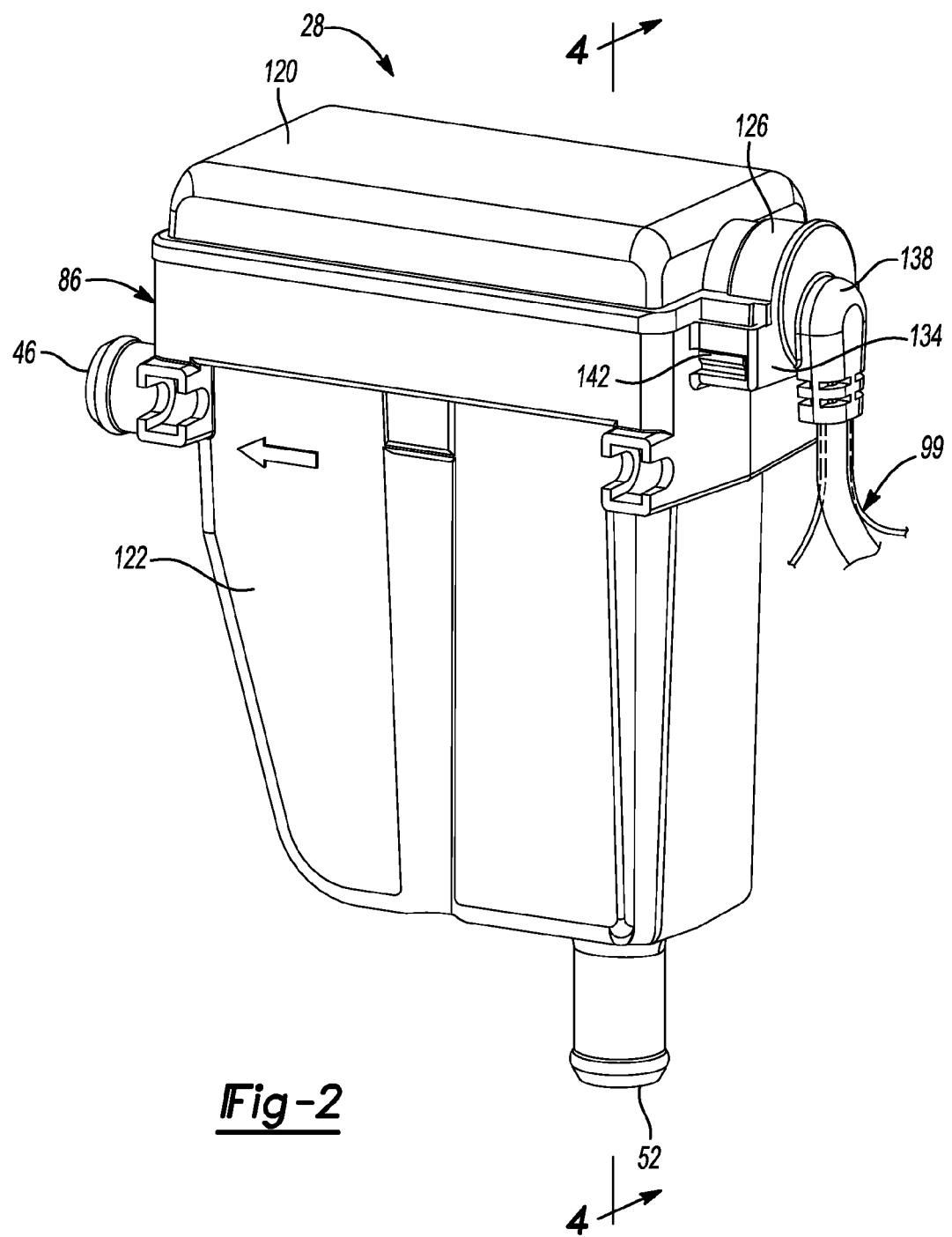
FIG. 2 is a perspective view of a battery coolant heater.
Figure 3:
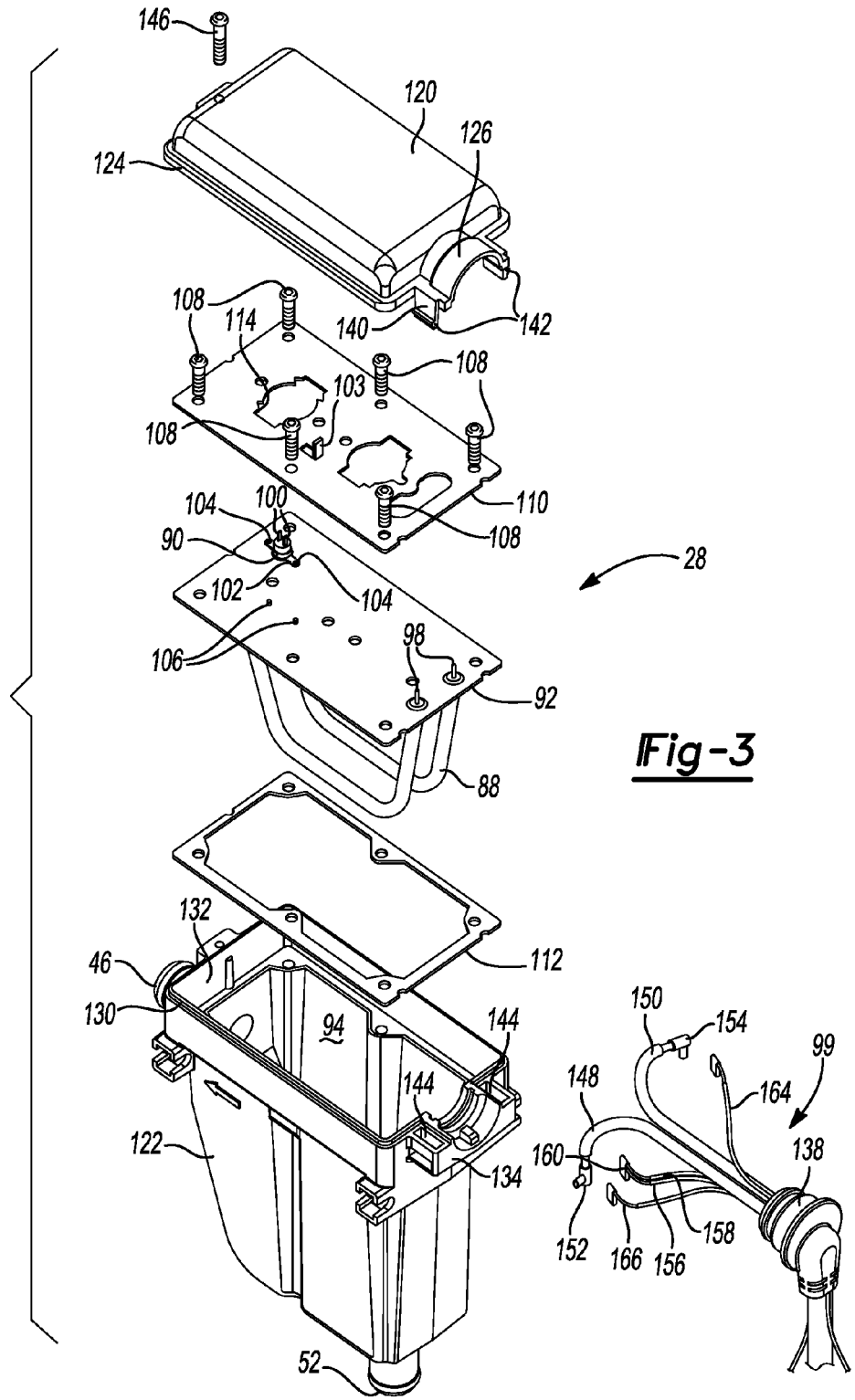
FIG. 3 is an exploded perspective view of the heater depicted in FIG. 2.
Figure 4:
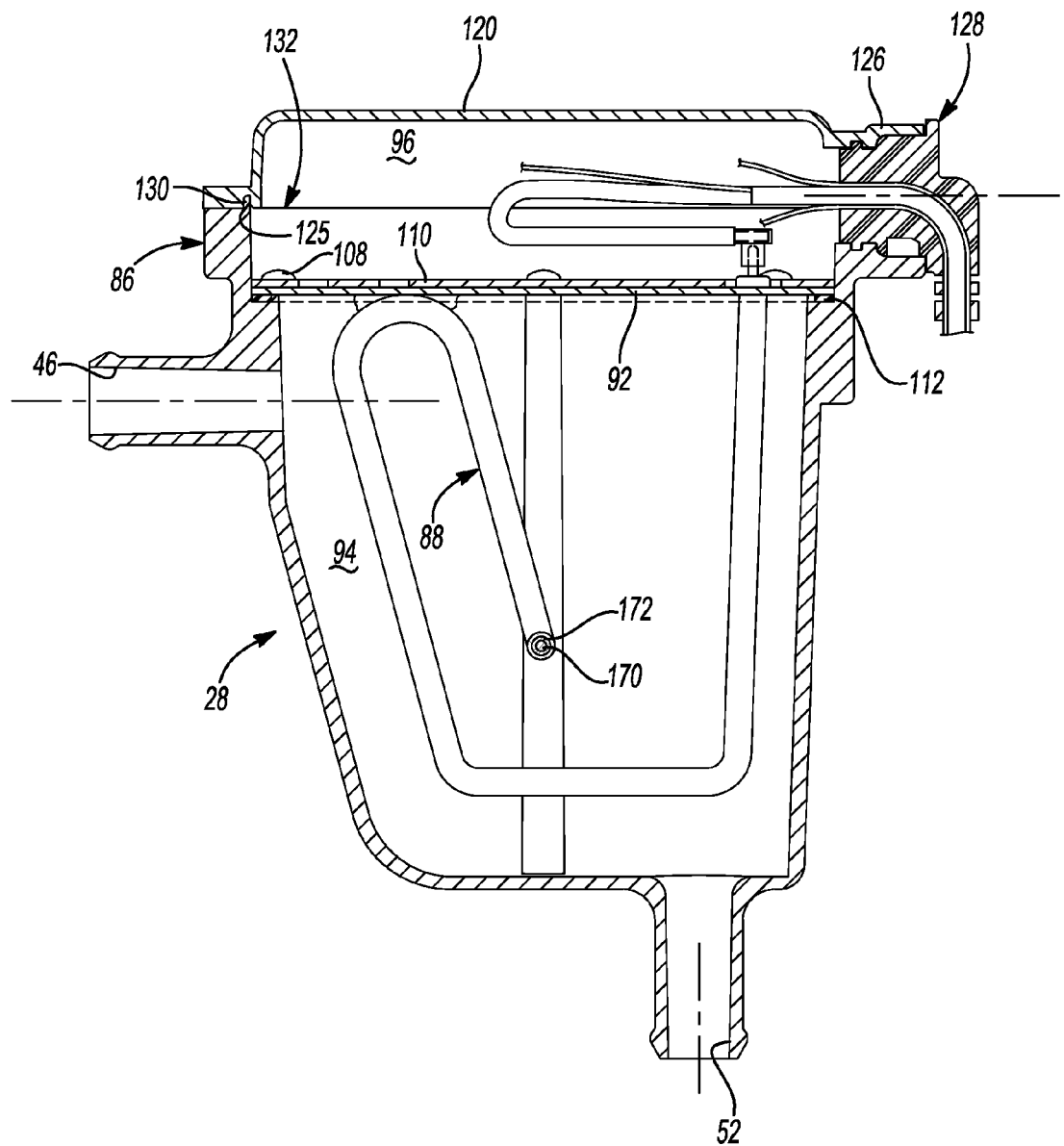
FIG. 4 is a fragmentary cross-sectional view of the heater depicted in FIG. 2.
Figure 5:
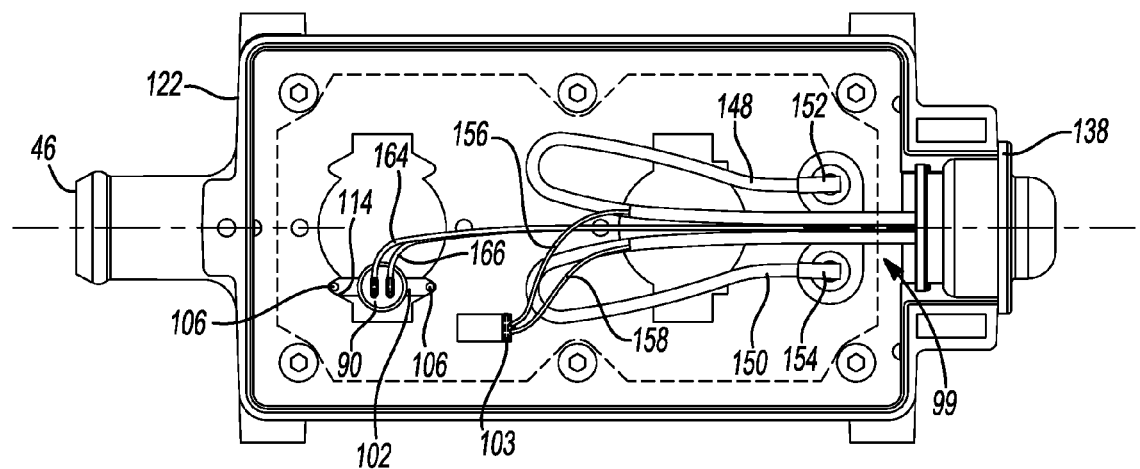
FIG. 5 is a fragmentary top view of the heater having the cover removed.
Figure 6:
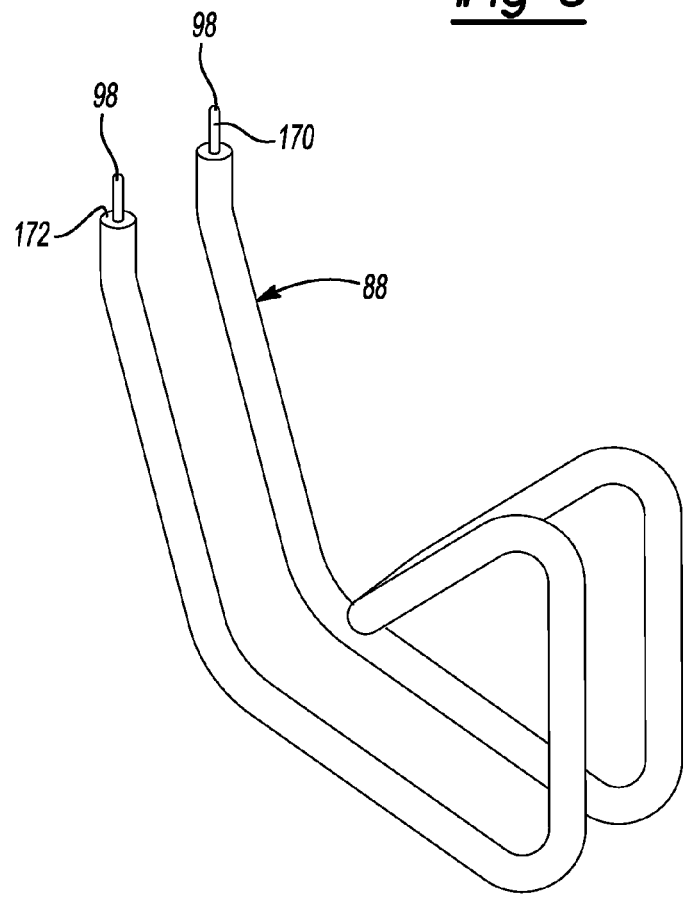
FIG. 6 is a perspective view of a heating element.

An exemplary electric vehicle is schematically depicted in FIG. 1 at reference numeral 10. Electric vehicle 10 includes an electric motor 12 drivingly coupled to a transmission 14. Transmission 14 provides output torque to at least one of wheels 16. A battery pack 20 provides electrical energy to motor 12.

A battery thermal management system 24 is mounted on vehicle 10 to maintain battery pack 20 within a predetermined operating temperature range. For example, it may be desirable to maintain battery pack 20 within an operating range of substantially 50-100° F. The charging and discharging characteristics of the batteries within battery pack 20 are most efficient at this temperature range. Battery thermal management system 24 achieves this goal by circulating a coolant through battery pack 20 to transfer heat between the coolant and the battery pack. When the battery temperature is lower than a predetermined lower limit, an electric heater 28 may be energized to heat coolant flowing in a heat transfer relationship to individual batteries or portions of battery pack 20. Should the operating temperature of battery pack 20 be greater than a predetermined upper limit, a chiller 30 reduces the temperature of the coolant flowing around or through battery pack 20.

Battery thermal management system 24 also includes a reservoir 34 containing a coolant 36. A supply line 38 is plumbed in communication with an inlet 40 of a first pump 42. Pressurized fluid is provided from an outlet 44 of first pump 42 to an inlet 52 of coolant heater 28 via a line 50. Coolant heater 28 includes an outlet 46 through which coolant flows via a line 54 to an inlet 56 of a second pump 58. An outlet 60 of second pump 58 provides pressurized fluid to an inlet 62 of chiller 30 via a coolant line 64. An outlet 66 of chiller 30 is plumbed in fluid communication with an inlet 68 of a third pump 70. A line 72 interconnects outlet 66 and inlet 68. Pump 70 includes an outlet 76 providing pressurized fluid to inlet 78 of battery pack 20 via a coolant line 80. An outlet 84 of battery pack 20 supplies fluid to return line 80 and reservoir 34. Within battery pack 20, a plurality of parallel paths may exist between inlet 78 and outlet 84. On the other hand, a single serpentine pathway may be positioned in thermal conductivity with portions of batteries, groups of batteries, or housings mounting the batteries within battery pack 20 to efficiently transfer heat. Furthermore, other systems including less than three pumps are contemplated as being within the scope of the present disclosure.

As shown in FIGS. 2-5, coolant heater 28 includes a housing 86, a resistive heating element 88 and a thermistor 90. A divider plate 92 separates housing 86 into a first chamber 94 containing coolant and a second chamber 96 that remains dry. Heating element 88 is fixed to divider plate 92 and positioning in first chamber 94 in a heat transfer relationship with coolant 36 that flows through housing 86. Terminal pins 98 of heating element 88 protrude through a divider plate 92 and are in electrical communication with a wire harness 99 for supplying electrical energy to heater 28.

Thermistor 90 includes electrical connectors 100 to allow transmission of a signal indicative of a temperature of the coolant within first chamber 94 to a controller 101. A ground terminal 103 is fixed to divider plate 92. Terminal pins 98, ground terminal 103 and connectors 100 are positioned within second chamber 96.

A bracket 102 fixes thermistor 90 in thermal communication with divider plate 92 such that thermistor 90 is operable to sense the temperature of the fluid contacting the opposite side of divider plate 92. Bracket 102 includes apertures 104 in receipt of buttons 106 protruding from divider plate 92. A plurality of screws 108 fix a clamp plate 110, a gasket 112, divider plate 92 and bracket 102 to housing 86. Notches 114 are formed in clamp plate 110 to clear buttons 106 and allow an adjacent portion of clamp plate 110 to engage bracket 102.

Housing 86 includes a cap 120 fixed to a body 122. Body 122 may be a cast metal component. Cap 120 is preferably a plastic molded member. Cap 120 includes a flange 124 equipped with a groove 125 extending about its perimeter. A boss 126 is positioned at one end of cap 120 to form a portion of an electrical wire outlet 128. A lip 130 is integrally formed with body 122 and extends around an opening 132 of body 122. Lip 130 extends within groove 125 to sealingly enclose second chamber 96 and protect the electrical connections from exposure to the environment. Body 122 includes a protrusion 134 that cooperates with boss 126 to sealingly mount a strain relief fitting 138 to the assembly of cap 120 and body 122. Flexible legs 140 are integrally formed with boss 126. A catch 142 outwardly extends from a distal end of each leg 140. Each catch 142 cooperates with one of pockets 144 formed in protrusion 134 to couple cap 120 to body 122. A threaded fastener 146 also fixes cap 120 to body 122.

Wire harness 99 extends through strain relief fitting 138 to allow an electrical connection between the wires of wire harness 99 to terminal pins 98, ground terminal 103 and electrical connectors 100. More particularly, wire harness 99 includes heating element power supply wires 148, 150 terminating at connectors 152, 154. Connectors 152, 154 are electrically and mechanically fixed to terminals 98. Ground wires 156, 158 are fixed to a common connector 160 that is electrically and mechanically coupled to ground terminal 103. Signal wires 164, 166 are electrically coupled to thermistor connectors 100.

To meet target heater performance specifications, resistive heating element 88 includes a particular geometry to provide a desired watt density. In particular, it may be desirable to provide a watt density of approximately 200 watts per square inch. This may be accomplished by providing a 5000 watt heating element having an external surface area of 25 square inches. Heating element 88 includes a metallic resistive wire 170 coated for a majority of its length by a sheath 172. Terminal pins 98 are shaped as elongated cylinders at each end of wire 170.

Thermistor 90 functions by changing its resistance based on a change in temperature. Accordingly, thermistor 90 acts as a resistor having a resistance that varies in accordance with the temperature of its surroundings. A relatively simple circuit may be constructed allowing communication between thermistor 90 and controller 101 such that controller 101 may determine a temperature of the coolant positioned within heater 28 based on the output from thermistor 90.

As previously noted, thermistor 90 is fixed to divider plate 92 thereby eliminating the need to procure and mount a separate temperature sensor downstream of inlet 52. Due to the very close proximity of thermistor 90 to resistive element 88, controller 101 may accurately estimate the temperature of coolant in close proximity to heating element 88. During operation, controller 101 initiates a supply of current to heating element 88 when it determines that the temperature of the coolant in contact with divider plate 92 is less than a predetermined lower limit based on the thermistor signal. Controller 101 discontinues a supply of electrical energy to heating element 88 when the temperature of coolant 36 in contact with divider plate 92 exceeds a predetermined maximum.

It is contemplated that battery pack 20 of vehicle 10 is configured as a relatively high voltage (450 Vdc) power supply. Controller 101 provides power to heating element 88 using battery pack 20. Controller 101 functions to protect heating element 88 from overheating. For example, controller 101 may also determine the rate of coolant temperature increase within second chamber 96. When the rate of temperature increase exceeds a predetermined maximum rate, controller 101 discontinues the supply of current to heating element 88. Accordingly, controller 101 prevents the overheating of heating element 88. Protection is provided should one or more of first pump 42, second pump 58 or third pump 70 cease to operate.

Controller 101 may selectively supply and discontinue the supply of current to heating element 88 using pulse width modulation. Such a control strategy may reduce the overall quantity of energy provided to heating element 88 over a prolonged operating period. Additionally, controller 101 may provide closed-loop control of the heater function based on the signal provided by thermistor 90.

It is also contemplated that chiller 30 may be controlled in a similar manner. For example, chiller 30 may be tasked to reduce the temperature of coolant 36 should the coolant exceed a predetermined threshold temperature. The chiller threshold temperature need not be the same as a predetermined upper limit at which electrical energy is no longer supplied to heater 28. Chiller 30 may be controlled using the output signal from thermistor 90 or alternatively controller 101 may be in receipt of another signal from a temperature sensor positioned in closer communication to chiller 30.

Figure 7:
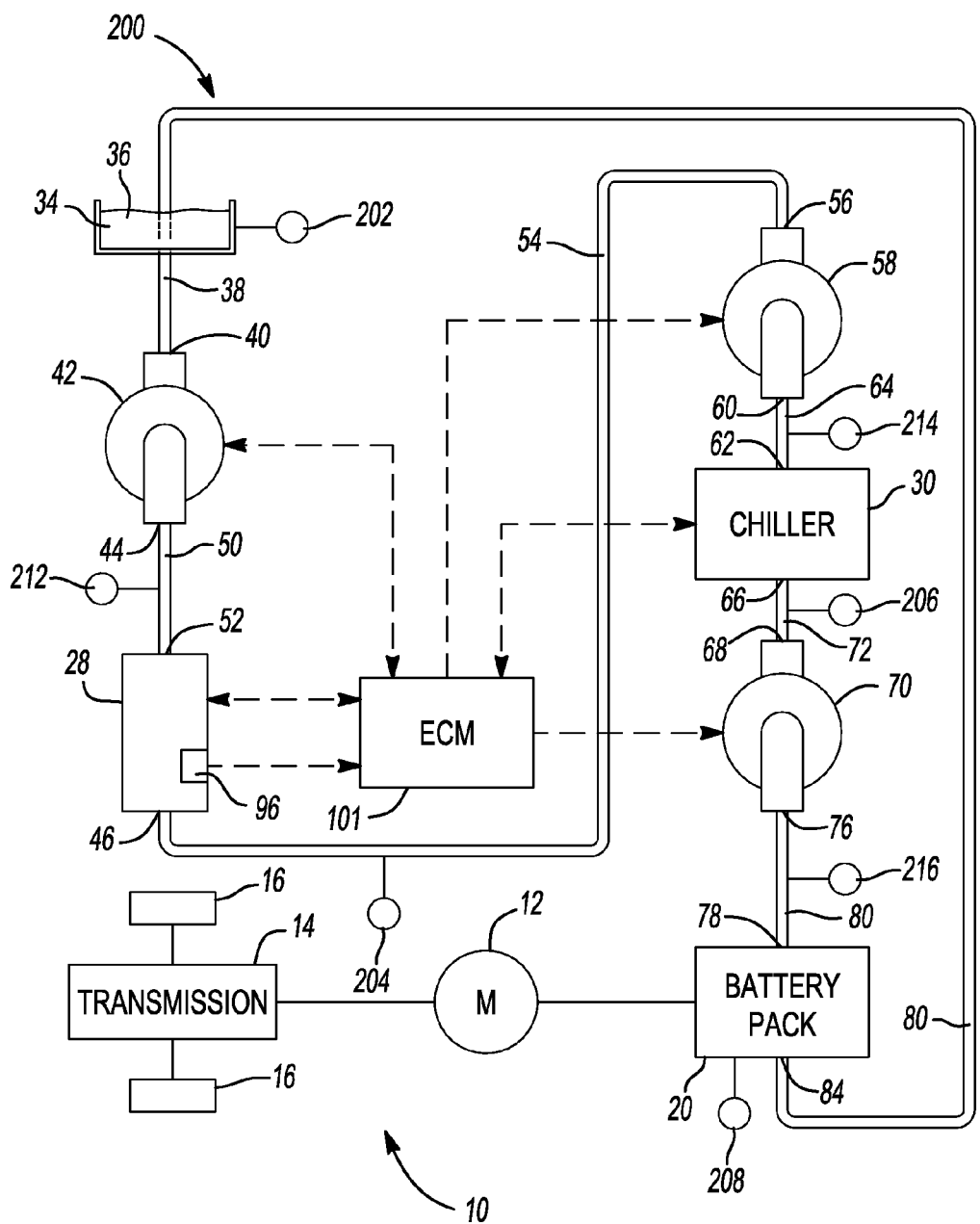
FIG. 7 is a schematic depicting an electric vehicle equipped with an alternate battery thermal management system.

FIG. 7 represents an alternate battery thermal management system 200. Battery thermal management system 200 is substantially similar to management system 24. Accordingly, like elements will retain their previously introduced reference numerals. Battery thermal management system 200 includes a number of temperature sensors as well as flow indicators to provide controller 101 additional information regarding the operating condition of battery thermal management system 200. Not all of the sensors or indicators are required within a singular system but are depicted as being optional. For example, a first temperature sensor 202 outputs a signal indicative of the temperature of coolant 36 within reservoir 34. A second temperature sensor 204 is provided downstream from outlet 46 of coolant heater 28 to output a signal representative of the coolant temperature at that location. A third temperature sensor 206 is positioned downstream from chiller 30. A fourth temperature sensor 208 is positioned in communication with the coolant flowing through battery pack 20. In similar fashion, first, second and third flow indicators, 212, 214 and 216 are positioned downstream from first, second and third pumps 42, 58, 70, respectively. Each of the flow indicators output a signal to controller 101 indicating whether the pump immediately upstream of the indicator is functioning properly. The supply of electrical energy to heater 28 may be discontinued should controller 101 determine that any one of the pumps is not providing a desired output flow.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric vehicle battery temperature control system for varying the temperature of a liquid coolant flowing in a heat transfer relationship with an electric vehicle battery, the temperature control system comprising:
    a heater housing having a coolant inlet and a coolant outlet;
    a heating element positioned within the housing in a heat transfer relationship with the liquid coolant;
    a thermistor positioned in the housing to output a signal indicative of a temperature of the liquid battery coolant in the housing; and
    a controller energizing the heating element when the signal represents that the liquid coolant temperature is less than a predetermined lower limit, wherein the controller determines a rate of coolant temperature increase and discontinues the supply of power to the heating element based on the temperature rate of change exceeding a predetermined threshold, wherein the housing includes a body, a divider panel, and a removable cap, the heating element and the thermistor being fixed to the divider panel, and further wherein the divider panel sealingly separates first and second chambers within the housing, a heat transfer portion of the heating element being positioned within the first chamber in communication with the liquid battery coolant, electrical terminals of the heating element extending through the divider panel into the second chamber, the thermistor being positioned within the second chamber out of communication with the liquid battery coolant and mounted in a heat transfer relationship to the divider, the heater further including a wire harness extending through the second chamber and having wires with ends electrically coupled to the terminals.

2. The battery temperature control system of claim 1, wherein the coolant inlet and coolant outlet extend at substantially ninety degrees to each other.

3. The battery temperature control system of claim 2, further including a clamp plate positioned within the second chamber and fixed to the divider panel, the thermistor being fixed to the divider panel with the clamp plate.

4. An electric vehicle battery temperature control system for varying the temperature of a liquid coolant flowing in a heat transfer relationship with an electric vehicle battery, the temperature control system comprising:
    a housing having a coolant inlet and a coolant outlet, the housing being spaced apart from the electric vehicle battery;
    a heating element positioned within the housing in a heat transfer relationship with the liquid coolant;
    a thermistor positioned in the housing to output a signal indicative of a temperature of the battery coolant; and
    a controller energizing the heating element when the signal represents that the coolant temperature is less than a predetermined lower limit, wherein the coolant inlet and coolant outlet extend at substantially ninety degrees to each other.

5. An electric vehicle battery temperature control system for varying the temperature of a liquid coolant flowing in a heat transfer relationship with an electric vehicle battery, the temperature control system comprising:
    a housing having a coolant inlet and a coolant outlet, the housing being spaced apart from the electric vehicle battery;
    a heating element positioned within the housing in a heat transfer relationship with the liquid coolant;
    a thermistor positioned in the housing to output a signal indicative of a temperature of the battery coolant; and
    a controller energizing the heating element when the signal represents that the coolant temperature is less than a predetermined lower limit, further including a clamp plate positioned within the second chamber and fixed to the divider panel, the thermistor being fixed to the divider panel with the clamp plate.

* * * * *